US011320600B2

(12) United States Patent
Jones et al.

(10) Patent No.: US 11,320,600 B2
(45) Date of Patent: May 3, 2022

(54) FIBER OPTIC CONNECTOR FOR HARDWARE INTERIORS AND METHOD OF USING SAME

(71) Applicant: CORNING RESEARCH & DEVELOPMENT CORPORATION, Corning, NY (US)

(72) Inventors: Ashley Wesley Jones, Denton, TX (US); Wei-Cheng Lee, Hsinchu County (TW); Hsiang-Peng Liao, New Taipei (TW); Louis Edward Parkman, III, Keller, TX (US); Ming-Sung Wu, New Taipei (TW)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/007,219

(22) Filed: Aug. 31, 2020

(65) Prior Publication Data

US 2021/0080657 A1 Mar. 18, 2021

Related U.S. Application Data

(60) Provisional application No. 62/899,345, filed on Sep. 12, 2019.

(51) Int. Cl.
*G02B 6/38* (2006.01)
(52) U.S. Cl.
CPC ......... *G02B 6/3825* (2013.01); *G02B 6/3838* (2013.01); *G02B 6/3869* (2013.01); *G02B 6/3897* (2013.01)
(58) Field of Classification Search
CPC .. G02B 6/3825; G02B 6/3838; G02B 6/3869; G02B 6/3897; G02B 6/38
See application file for complete search history.

(56) References Cited

U.S. PATENT DOCUMENTS 5,717,802 A 2/1998 Briggs et al.
5,719,977 A 2/1998 Lampert et al.
(Continued)

FOREIGN PATENT DOCUMENTS

JP 2010-256703 A 11/2010
WO 2015/016892 A1 2/2015

OTHER PUBLICATIONS

European Patent Application No. 20195851.9 Extended European Search Report dated Feb. 4, 2021; 14 pages European Patent Office.

*Primary Examiner* — Jennifer Doan
(74) *Attorney, Agent, or Firm* — Adam R. Weeks

(57) ABSTRACT

A fiber optic connector for connecting one or more optical fibers to a fiber optic component includes: a ferrule configured to receive the one or more optical fibers; a ferrule holder configured to be coupled to the ferrule, wherein the ferrule and ferrule holder forms a ferrule support assembly when coupled together; and a shroud configured to be positioned about the ferrule support assembly and connectable to the fiber optic component. The ferrule support assembly and the shroud are configured so that the ferrule support assembly is movable relative to the shroud to positions outside the shroud when the shroud is disconnected from the fiber optic component, and the ferrule support assembly is confined within the shroud when the shroud is connected to the fiber optic component. A method of forming a fiber optic assembly using such a fiber optic connector is also disclosed.

20 Claims, 11 Drawing Sheets

(56) References Cited

U.S. PATENT DOCUMENTS

| | | | |
|---|---|---|---|
| 5,862,282 A | | 1/1999 | Matsuura et al. |
| 5,971,626 A | | 10/1999 | Knodell et al. |
| 8,764,316 B1 | * | 7/2014 | Barnette ................ G02B 6/245 |
| | | | 385/80 |
| 9,933,583 B2 | | 4/2018 | Yan et al. |
| 10,180,541 B2 | | 1/2019 | Coenegracht et al. |
| 10,578,811 B2 | * | 3/2020 | Bookbinder ......... G02B 6/3865 |
| 2016/0139344 A1 | | 5/2016 | De Los Santos Campos et al. |
| 2016/0209599 A1 | * | 7/2016 | Van Baelen ........... G02B 6/387 |
| 2017/0315307 A1 | | 11/2017 | Lee et al. |
| 2017/0343741 A1 | * | 11/2017 | Coenegracht ........ G02B 6/3871 |

* cited by examiner

FIBER OPTIC CONNECTOR FOR HARDWARE INTERIORS AND METHOD OF USING SAME

PRIORITY APPLICATION

This application claims the benefit of priority of U.S. Provisional Application No. 62/899,345, filed on Sep. 12, 2019, the content of which is relied upon and incorporated herein by reference in its entirety.

TECHNICAL FIELD

This disclosure relates generally to optical connectivity, and more particularly to a fiber optic connector having a low-cost, simplified design for use in hardware interiors where the optical fiber, fiber optic cable, and/or connector are subject to relatively low environmental forces. The disclosure also relates to a method of using such a fiber optic connector.

BACKGROUND

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" fiber optic connector). FIGS. 1 and 2 illustrate an exemplary fiber optic connector 10 used in many modern fiber optic networks. Although the fiber optic connector 10 is shown in the form of a SC-type connector, the features may be applicable to different connector designs. This includes ST, LC, and MU-type connectors, for example, and other single-fiber or multi-fiber connector designs.

As shown in these figures, the connector 10 includes a ferrule 12 having a ferrule bore 14 ("micro-hole") configured to support an optical fiber 16, a ferrule holder 18 from which the ferrule 12 extends, a housing 20 having a cavity 22 in which the ferrule 12 and ferrule holder 18 are received, and a connector body 24 configured to cooperate with the housing 20 to retain the ferrule 12 and ferrule holder 18 within the housing 20. More specifically, a back end of the ferrule 12 is received in a first portion of the ferrule holder 18 and is secured therein in a known manner (e.g., press-fit, adhesive, molding the ferrule holder 18 over the back end of the ferrule 12, etc.). The ferrule 12 and ferrule holder 18 may even be a monolithic structure in some embodiments. The ferrule holder 18 is biased to a forward position within the housing 20 by a spring 26, which extends over a second portion of the ferrule holder 18 that has a reduced cross-sectional diameter/width compared to the first portion. The spring 26 also interacts with internal geometry of the connector body 24, which may be secured to the housing 20 using a snap-fit or the like. For example, FIGS. 1 and 2 illustrate a rear portion of the housing 20 having cut-outs or slots on opposite sides so as to define a split shroud. The connector body 24 has tabs configured to be snapped into the slots and retained therein due to the geometries of the components. When the connector 10 is assembled as shown in FIG. 1, a front end of the ferrule 12 projects beyond a front end of the housing 20. The ferrule end face presents the optical fiber 16 for optical coupling with a mating component (e.g., another fiber optic connector; not shown), such as in an adapter.

The connector 10 is essentially designed as a two-part outer body 28 (i.e., the housing 20 and the connector body 24) that encases and traps the assembly of the ferrule 12 and ferrule holder 18 within the interior of the two-part outer body 28. The two-part design allows the ferrule 12 and ferrule holder 18 (which may already be coupled together) to be initially loaded within the outer body 28 during assembly of the connector 10. The ferrule 12 and ferrule holder 18 may essentially float within the outer body 28 and be movable under the bias of the spring 26. The spring 26 biases the ferrule 12 to a forward position so that when the fiber optic connector is mated with another connector (e.g., in an adapter), the ferrule 12 can make physical contact with the ferrule of the mating connector. Such physical contact typically occurs within an alignment sleeve of an adapter. The physical contact and alignment allows an optical connection to be established between the optical fibers supported by the ferrules.

Fiber optic network designers and network technicians terminate optical fibers using standard fiber optic connectors, such as connector 10, generally without consideration of the severity of the environment in which the connectors will be used. For example, in some environments, the optical fiber, fiber optic cable, and/or the associated connectors may be subject to relatively high environmental forces. These environmental forces may come in the form of various tugs, pulls, vibrations, repeated connections/disconnections, etc. during use, installation events, and/or maintenance events. The connectors must be designed to withstand the forces in such high-impact applications so as to provide a reliable optical connection. The fiber optic connector 10 described above is generally designed to withstand the forces in high-impact applications.

There are many environments in a fiber optic network, however, where the optical fiber, fiber optic cable, and/or the associated connectors are subject to minimal environmental forces during use, installation events, and/or maintenance events. These environments include hardware interiors, where it may not be necessary for the connectors be designed to withstand the environmental forces typical of high-impact applications. Nevertheless, network designers and technicians typically use a "one connector fits all" approach and use the same conventional connectors for terminating optical fibers regardless of the environment. Conventional fiber optic connectors, such as connector 10 described above, may include more components than necessary for use in low-impact applications where environmental forces are relatively low. Both the number of components and associated assembly steps may unnecessarily increase the costs associated with a fiber optic network.

SUMMARY

A fiber optic connector for connecting one or more optical fibers to a fiber optic component includes a ferrule configured to receive the one or more optical fibers, a ferrule holder configured to be coupled to the ferrule, wherein the ferrule and ferrule holder forms a ferrule support assembly when coupled together, and a shroud configured to be positioned about the ferrule support assembly and connectable to the fiber optic component. The ferrule support assembly and the shroud are configured so that the ferrule support assembly is movable relative to the shroud to positions outside the shroud when disconnected from the fiber optic component, and the ferrule support assembly is confined within the shroud when connected to the fiber optic component.

In one embodiment, the ferrule holder includes a first shoulder and the shroud includes a second shoulder, and wherein the first and second shoulders are configured to abut each other (e.g., without an intervening spring) when the shroud is connected to the fiber optic component. The ferrule holder and the shroud may include orientation features and be configured such that there is only one relative orientation between the ferrule support assembly and the shroud that permits the ferrule support assembly to be fully received within the shroud. In one embodiment, the orientation features may include a pair of cutouts in the ferrule holder and a pair of wedges on the shroud, wherein the wedges are configured to be received in the cutouts when the ferrule support assembly is seated within the shroud. Additionally, the ferrule holder and the shroud may include anti-rotation features configured to limit the rotation of the ferrule support assembly relative to the shroud. For example, one of the ferrule holder or the shroud may include one or more guide tabs and the other of the ferrule holder or the shroud may include one or more grooves, wherein the guide tab(s) are configured to be received in the groove(s) when the ferrule support assembly is received in the shroud.

In one embodiment, the shroud may a split shroud including a slot that extends along the length of the shroud. In an alternative embodiment, the slot may be omitted such that the shroud is circumferentially continuous. The ferrule support assembly may be configured to be received within the shroud in a clearance fit that provides some lateral movements and/or rotational movements of the ferrule support assembly within the shroud. This allows the connector to accommodate a certain amount of misalignment when coupled to the fiber optic component. In one embodiment, the shroud may include a latch for selectively disconnecting the shroud from the fiber optic component. In one embodiment, the shroud has low-cost molded construction formed from a thermoplastic material. More particularly, the shroud may have a one-piece monolithic design.

In one embodiment, the fiber optic connector may be used in a fiber optic hardware assembly used in fiber optic networks. The term "fiber optic hardware assembly" is used in this disclosure in a broad sense, referring to interchangeable items for another, larger hardware item (e.g., a housing, module, cassette or the like that mounts to an equipment rack).

The fiber optic hardware assembly includes a hardware body defining an interior and having at least one side separating the interior from an external environment. One or more adapters may be coupled to the at least one side of the hardware body, wherein each adapter of the one or more adapters has one or more internal ports on a first end of the adapter and one or more external ports on a second end of the adapter. The one or more internal ports are accessible from the interior of the hardware body and the one or more external ports are accessible from the external environment. A plurality of fiber optic assemblies may be contained within the interior, wherein each of the plurality of fiber optic assemblies includes an optical fiber and a fiber optic connector coupled to the optical fiber. The fiber optic connector includes a ferrule secured to the optical fiber, a ferrule holder coupled to the ferrule, wherein the ferrule and ferrule holder form a ferrule support assembly, and a shroud positioned about the ferrule support assembly and connected to an internal port of the one or more adapters. The ferrule support assembly is movable relative to the shroud to positions outside the shroud when the shroud is disconnected from the internal port of the one or more adapters, and the ferrule support assembly is confined within the shroud when the shroud is connected to the internal port of the one or more adapters.

In one embodiment, the hardware body may be configured to isolate the interior of the hardware body from the external environment. Moreover, the hardware body may include a front side, a rear side, lateral sides between the front side and the rear side, a top side, and a bottom side. The one or more adapters may be disposed in the front side or the rear side of the hardware body.

In yet a further embodiment, a method of forming a fiber optic assembly includes coupling an optical fiber to a ferrule; coupling the ferrule to a ferrule holder, wherein the ferrule and the ferrule holder form a ferrule support assembly; positioning a shroud over the optical fiber at a location spaced from the ferrule support assembly; sliding the shroud toward the ferrule support assembly and receiving the ferrule support assembly within the shroud, wherein the ferrule support assembly remains movable relative to the shroud and capable of being positioned outside the shroud; and coupling the shroud to a fiber optic component, wherein when the shroud is coupled to the fiber optic component, the ferrule support assembly is confined within the shroud.

In one embodiment, the shroud is a split shroud having a slot, and wherein positioning the shroud over the optical fiber includes passing the optical fiber through the slot in the shroud. The method may further include orienting the ferrule support assembly relative to the shroud so that orientation features on the ferrule holder and the shroud are aligned; and receiving the ferrule support assembly within the shroud when the orientation features are aligned. The method may further include limiting the rotation of the ferrule support assembly relative to the shroud using, for example, anti-rotational features.

In an exemplary embodiment, the fiber optic component to which the connector is coupled may be an adapter having one or more ports at a first end of the adapter and one or more corresponding ports at a second end of the adapter. In this embodiment, the method may further include coupling the shroud to a port at the first end of the adapter and coupling a spring-biased connector to the corresponding port at the second end of the adapter. The spring-biased connector urges the ferrule support assembly rearward relative to the shroud so that a shoulder of the ferrule holder abuts a shoulder of the shroud and the ferrule support assembly is in a fixed position relative to the shroud.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
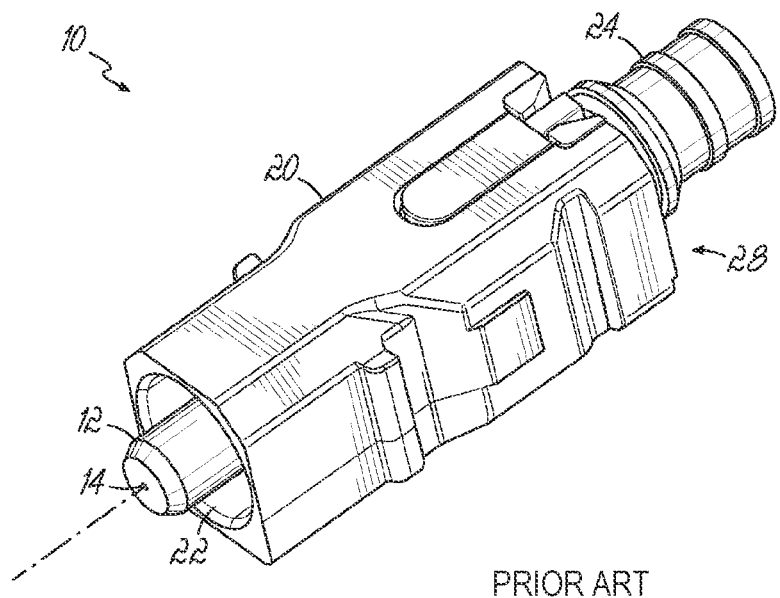
FIG. 1 is a perspective view of an exemplary conventional fiber optic connector.
Figure 2:
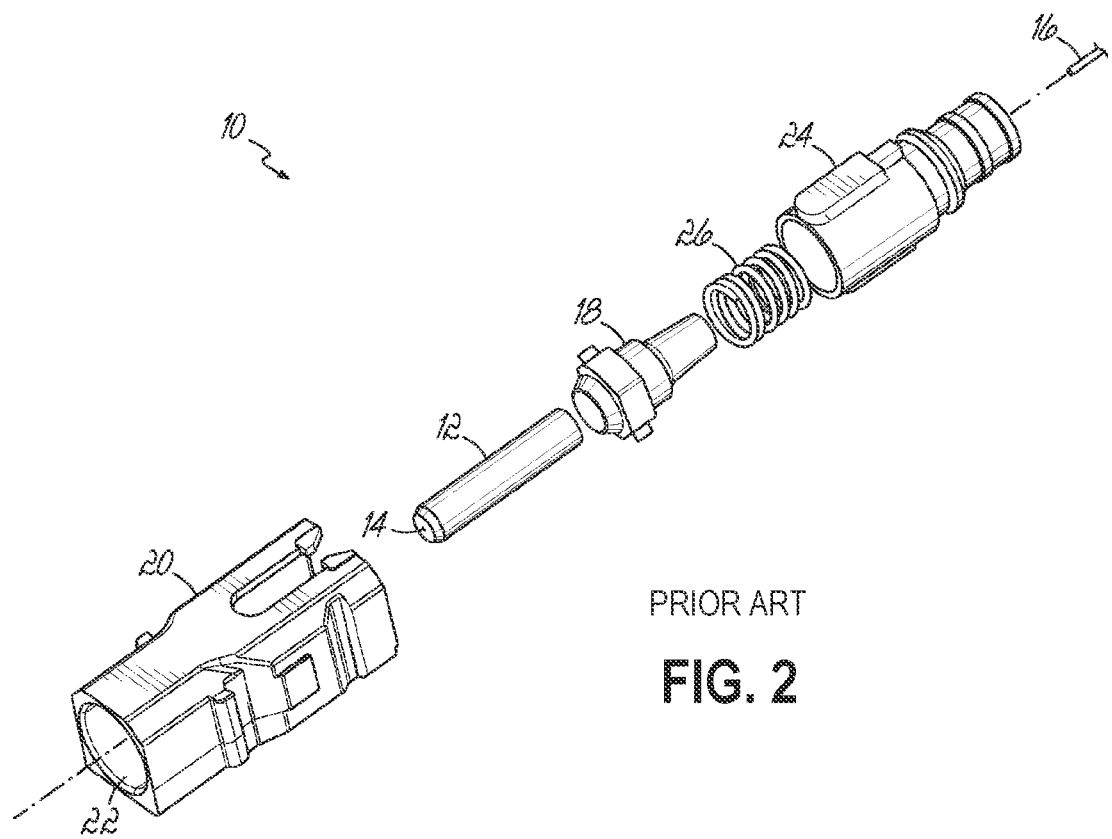
FIG. 2 is an exploded perspective view of the conventional fiber optic connector shown in FIG. 1.

FIGS. 3A-4A illustrate a connector 34 in accordance with an embodiment of the disclosure specifically designed for hardware interiors where environmental forces are non-existent or relatively minimal. Such a low-impact environment may be provided in an enclosure, housing, module, casing, or the like, where repeated connection/disconnection of the connectors are not required and which may be generally closed off or relatively isolated from the external environment. Similar to the connector 10, the connector 34 includes a ferrule 36 having a ferrule bore 38 configured to support an optical fiber 40, and a ferrule holder 42 coupled to the ferrule 36 and from which the ferrule 36 extends. The combination of the coupled ferrule 36 and the ferrule holder 42 will be referred to herein as the ferrule support assembly 44. The connector 30 further includes an outer housing or shroud 46 configured to receive the ferrule support assembly 44 and support the coupling of the optical fiber 40 to another fiber optic component. By way of example, and as discussed in more detail below, the shroud 46 may be configured to couple to an adapter for providing an optical connection to the optical fiber of a mating connector. Making an optical connection via an adapter is well known in the optical fiber technology.

The connector 34 differs from conventional connectors, such as connector 10 described above, in several ways which may provide certain benefits to optical fiber network designers. For example, the shroud 46 that surrounds and supports the ferrule support assembly 44 may have a simplified one-piece monolithic construction. This is opposed to the two-part housing (i.e., the housing 20 and the connector body 24) of traditional connectors. The two-part housing of traditional connectors trap the ferrule and ferrule holder within the housing such that the ferrule and ferrule holder are confined within the housing (but with a slight ability to move within the housing under the bias of the spring) and not movable to positions outside of the housing. In contrast, the shroud 46 of connector 34 does not trap the ferrule support assembly 44 within shroud 46. Instead, the shroud 46 is configured to receive the ferrule support assembly 44 therein and be in abutting engagement with the ferrule support assembly 44 in an "in-use" configuration. However, there is no fixation or confinement between the shroud 46 and the ferrule support assembly 44. Accordingly, the shroud 46 may be moved away from the ferrule support assembly 44 such that the ferrule support assembly 44 is no longer positioned within the confines of the shroud 46. This may provide an advantage in the assembly of the connector 34. It is only when the shroud 46 of the connector 34 is coupled to the fiber optic component that the ferrule support assembly 44 is confined within the shroud 46.

The one-piece construction of the shroud 46 not only simplifies the assembly of the connector 34, but also reduces the cost of the connector due to the use of fewer parts. For example, in an exemplary embodiment, connector 34 includes a ferrule 36, a ferrule holder 42 and the one-piece shroud 46. The two-part housing, crimp body, lead-in tube and spring of conventional connectors may be omitted from the connector 34. The omission of these additional parts may lead to significant cost reductions. Additionally, the shroud 46 is simpler and easier to manufacture as compared to the encasement of the ferrule and ferrule holder of conventional connectors. For example, the shroud 46 may be made in a low-cost molding process, such as an injection molding process, using molding tools that lack complexity (e.g., movable slides or the like). Additionally, the shroud 46 may be formed from low-cost thermoplastic materials. For example, the shroud 46 may be formed from polyetherimide, polybutylene terephthalate, polysulfone, polyphenylsulfone, polyethersulfone, polycarbonate, polypropylene, and/or polyethylene. The combination of lower cost manufacturing processes and lower cost materials may provide additional significant cost reductions. While molding processes using various thermoplastic materials may be preferred, the shroud 46 may be formed of other materials and through other processes. For example, in one embodiment, the shroud 46 may be formed through an additive manufacturing process using materials suitable for such processes. Alternatively, the shroud 46 may be made from metallic materials using machining or diecasting processes.

Details of the connector 34 in accordance with an embodiment of the disclosure are illustrated in FIGS. 3A-4A. The ferrule 36 is conventional and may be coupled to the optical fiber 40 in the conventional manner. The ferrule holder 42 may be plastic and formed through a molding process. Alternatively, the ferrule holder 42 may be formed from metal through a machining process. For example, the ferrule holder 42 may be formed from nickel, brass, plated brass, aluminum, stainless steel or other suitable metals. The coupling of the ferrule 36 to the ferrule holder 42 may also be achieved using conventional processes. Some of the details of the ferrule holder 42, however, may deviate from existing ferrule holders. More particularly, in one embodiment the ferrule holder 42 may include a first region or collar 50 from which the ferrule 36 extends, a second intermediate tubular portion 52, and a third trailing end tapered portion 54. The collar 50 has a cross dimension generally greater than the cross dimension of the intermediate tubular portion 52 to define a shoulder 56 at the junction of the two. The trailing end tapered portion 54 may have a cross dimension no greater than the intermediate tubular portion 52 and may decrease in size in a direction away from the intermediate tubular portion 52. A chamfer may connect the intermediate tubular portion 52 and the trailing end tapered portion 54. The end of the trailing end tapered portion 54 may be sized to be larger than the optical fiber 40 received in the ferrule holder 42.

Figure 4:
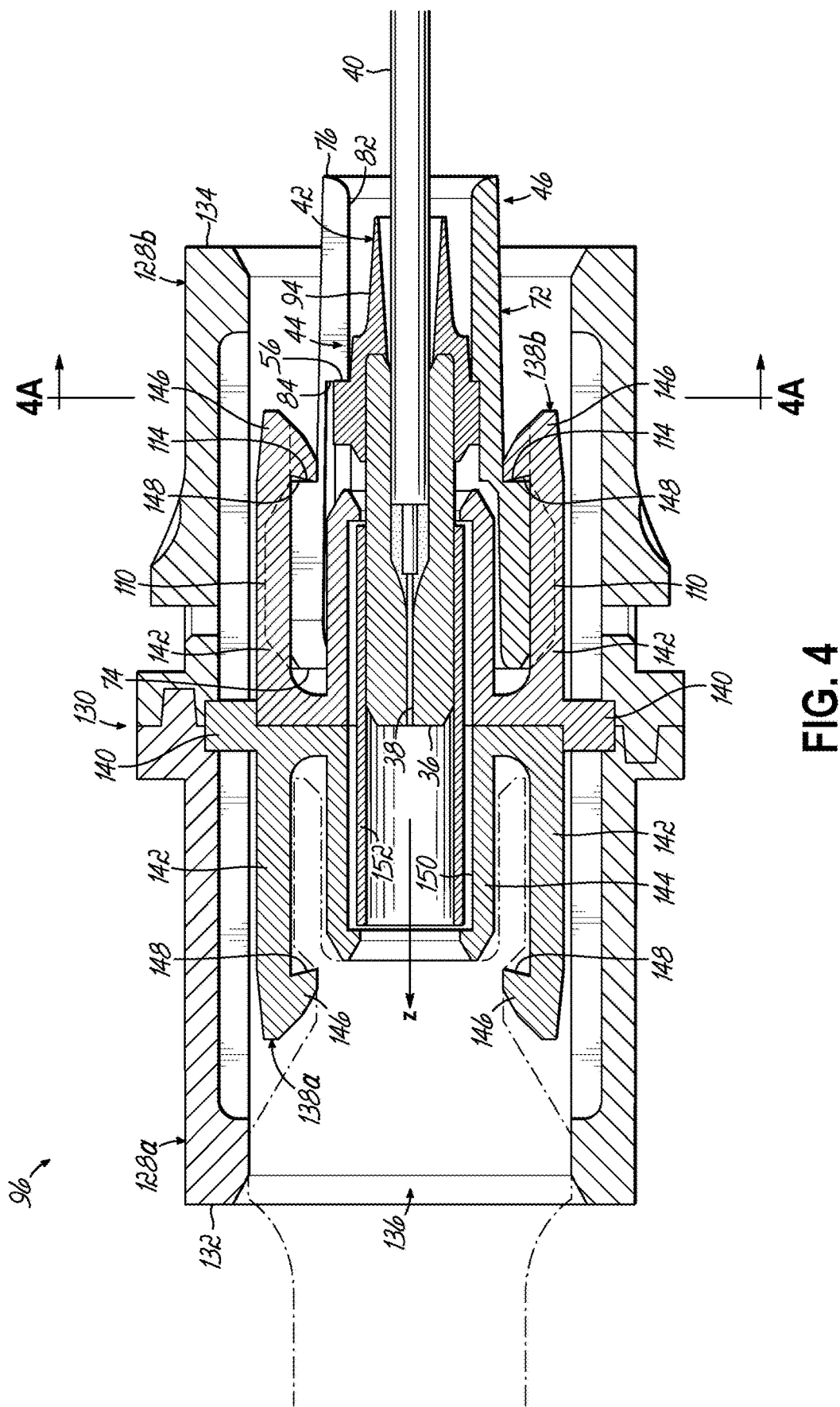
FIG. 4 is a cross-sectional view of the fiber optic connector shown in FIGS. 3A-3C coupled to a fiber optic adapter.
Figure 4A:
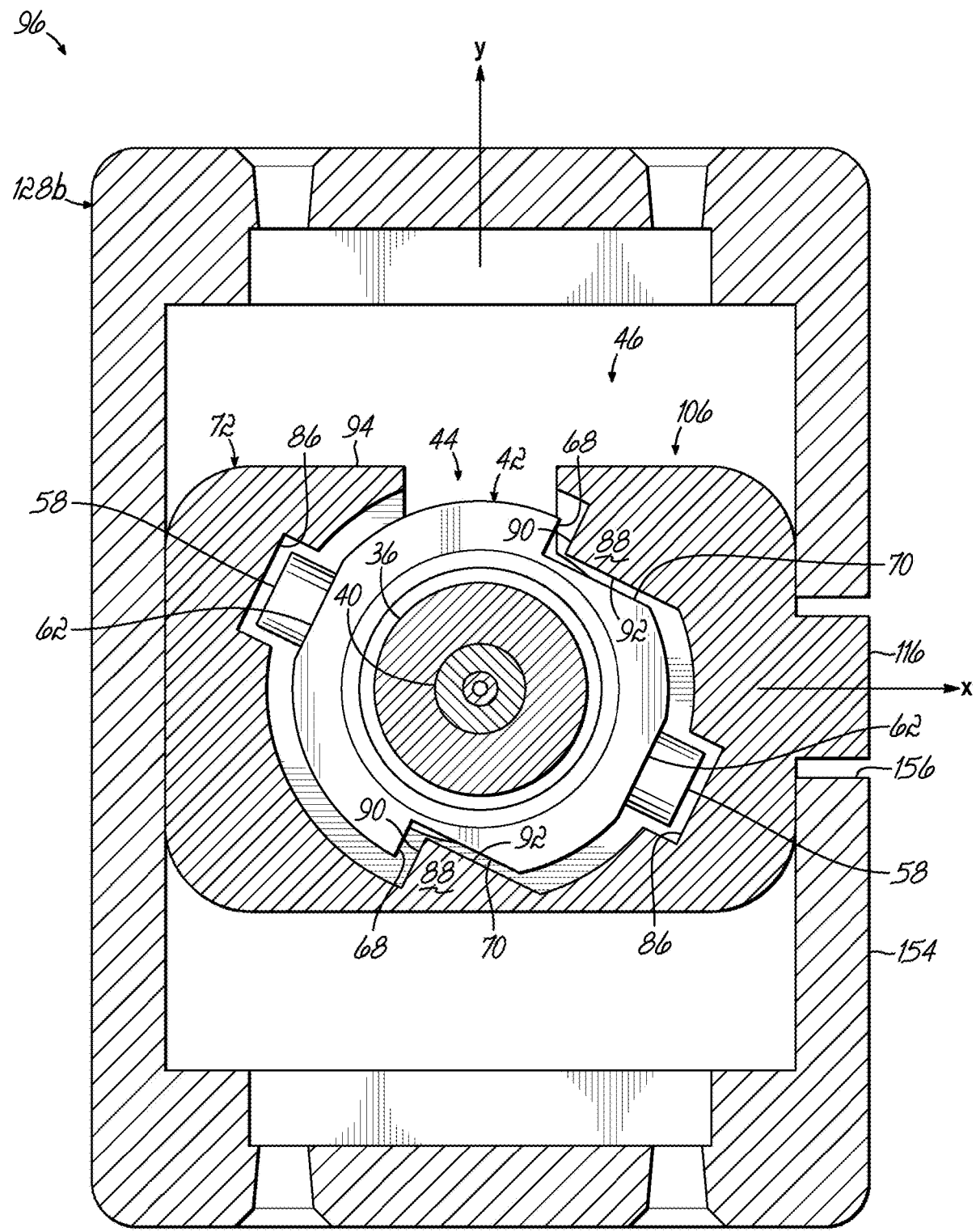
FIG. 4A is another cross-sectional view of the fiber optic connector shown in FIG. 4 taken along line 4A-4A.

The collar 50 may include a number of features for interacting with the shroud 46 in a desired manner. For example, the collar 50 may include a pair of opposed guide tabs 58 projecting radially from a sidewall 62 of the collar 50. The guide tabs 58 may be used to hold the ferrule support assembly 44 during, for example, shaping and/or polishing of the ferrule end face. Additionally, the collar 50 may include a pair of wedge-shaped cutouts 64. In an exemplary embodiment, each of the wedge-shaped cutouts 64 may include a first generally planar surface 68 and a second generally planar surface 70 that intersect at a corner (e.g., a 90-degree corner). As illustrated in FIG. 4A, the first generally planar surfaces 68 of the two cutouts 64 may be generally parallel to each other and may additionally be colinear with each other. In one embodiment, the colinear line along which the first planar surfaces 68 extend may also extend through a centerline of the ferrule holder 42. Furthermore, the second generally planar surfaces 68 of the two cutouts 64 may also be generally parallel to each other (but not colinear with each other). The purpose of the guide tabs 58 and the cutouts 64 will be discussed in more detail below.

In an exemplary embodiment, the shroud 46 may include a generally rectangular body 72 having a first proximal end 74, a second distal end 76, and a passageway 78 extending between the proximal and distal ends 74, 76. The passageway 78 may be generally circular in cross section and include a first passageway section 80 adjacent the proximal end 74 and a second passageway section 82 adjacent the distal end 76. The diameter of the first passageway section 80 is generally greater than the diameter of the second passageway section 82 to define a shoulder 84 at the junction between the two passageway sections 80, 82. The purpose of the shoulder 84 will be described in more detail below. The passageway 78 is configured to receive the ferrule support assembly 44 therein. The first passageway section 80 may be sized to be slightly greater than the collar 50 of the ferrule holder 42. However, the second passageway section 82 may be sized to be smaller than the collar 50, such that the collar 50 may not pass into the second passageway section 82. Moreover, the second passageway section 82 may be sized to be slightly greater than the intermediate tubular portion 52 and the trailing end tapered portion 54. Thus, the intermediate tubular portion 52 and trailing end tapered portion 54 may pass into the second passageway section 82 in a clearance fit, for example. The positioning of the ferrule support assembly 44 within the shroud 46 will be described in more detail below.

In an exemplary embodiment, the passageway 78 may include features that cooperate with the ferrule support assembly 44 in order to orient the ferrule support assembly 44 relative to the shroud 46 and to restrict the relative movement between ferrule support assembly 44 and the shroud 46. More particularly, the first passageway section 80 may include features that cooperate with the collar 50 of the ferrule holder 42. For example, the first passageway section 80 may include a pair of opposed grooves 86 configured to receive the guide tabs 58 on the collar 50. In one embodiment, the grooves 86 may extend from the proximal end 74 to the shoulder 84. Additionally, the first passageway section 80 may include a pair or ramps or wedges 88 positioned adjacent the shoulder 84. In an exemplary embodiment, each of the wedges 88 may include a first generally planar surface 90 and a second generally planar surface 92 that intersect at a corner (e.g., a 90-degree corner). As illustrated in FIG. 4A, the first generally planar surfaces 90 of the two wedges 88 may be generally parallel to each other and may additionally be colinear with each other. Furthermore, the second generally planar surfaces 92 of the two wedges 88 may also be generally parallel to each other (but not colinear with each other). The purpose of the grooves 86 and the wedges 88 will be discussed in more detail below.

The outer surface 94 of the shroud 46 may be contoured to include various features that allow the shroud 46 to interface with an adapter 96 used in fiber optic components and networks, for example. In an exemplary embodiment, and as delineated by the outer surface 90, the shroud 46 may include a proximal portion 102, an intermediate portion 104, and a distal portion 108. In an exemplary embodiment, the proximal portion 102 may be generally rectangular in cross section (e.g., square in one embodiment). From the perspective of FIGS. 3A-3D, the upper and lower surfaces of the proximal portion 102 each include a pair of spaced apart rails 110 that define a channel 112 therebetween. The purpose of the channels 112 will be described in more detail below.

The intermediate portion 106 may also be rectangular in cross section. The distance between the side surfaces along the intermediate portion 106 may be about the same as the distance between the side surfaces along the proximal portion 102 so as to be substantially flush therewith. However, the distance between the upper and lower surfaces along the intermediate portion 106 may be less than that of the proximal portion 102 to define upper and lower shoulders 114. The purpose of the shoulders 114 will be described in more detail below. Furthermore, at least one of the side surfaces of the intermediate portion 98 may include a key 116 extending therefrom. The key 116 is configured to orient the shroud 46 relative to the adapter 96, as discussed in more detail below.

The distal portion 108 may be configured such that the upper and lower surfaces are generally planar and substantially flush with the generally planar upper and lower surfaces of the intermediate portion 106. Unlike the intermediate portion 106, however, the side surfaces along the distal portion 108 may be generally arcuate with the central region of the side surfaces having a flat 118 that is substantially flush with the generally planar side surfaces of the intermediate portion 106.

In an exemplary embodiment, the shroud 46 may be configured as a split shroud having a slot 120 through the body 72 of the shroud 46 that is open to the passageway 78 of the shroud 46. The slot 120 is configured to extend along the full length of the shroud 46 from the proximal end 74 to the distal end 76 and is configured to allow the ferrule support assembly 44 to be positioned in the shroud 46 in a particular manner, as discussed below. The slot 120 may be positioned in the upper surfaces of the proximal portion 104, intermediate portion 106, and distal portion 108 from the perspective shown in FIGS. 3A-3D.

Figure 3A:
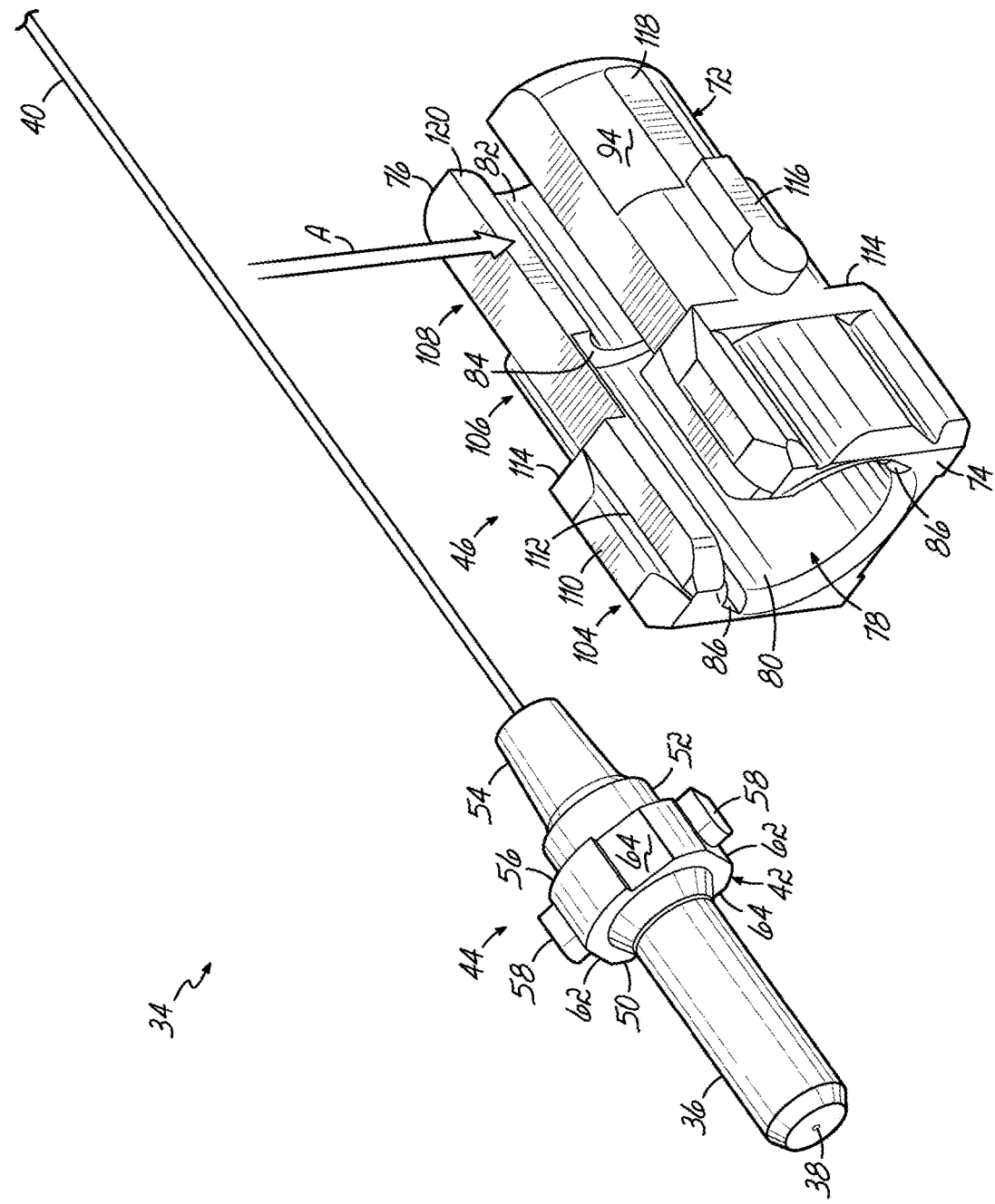
FIG. 3A is a disassembled perspective view of a fiber optic connector in accordance with an embodiment of the disclosure.
Figure 3B:
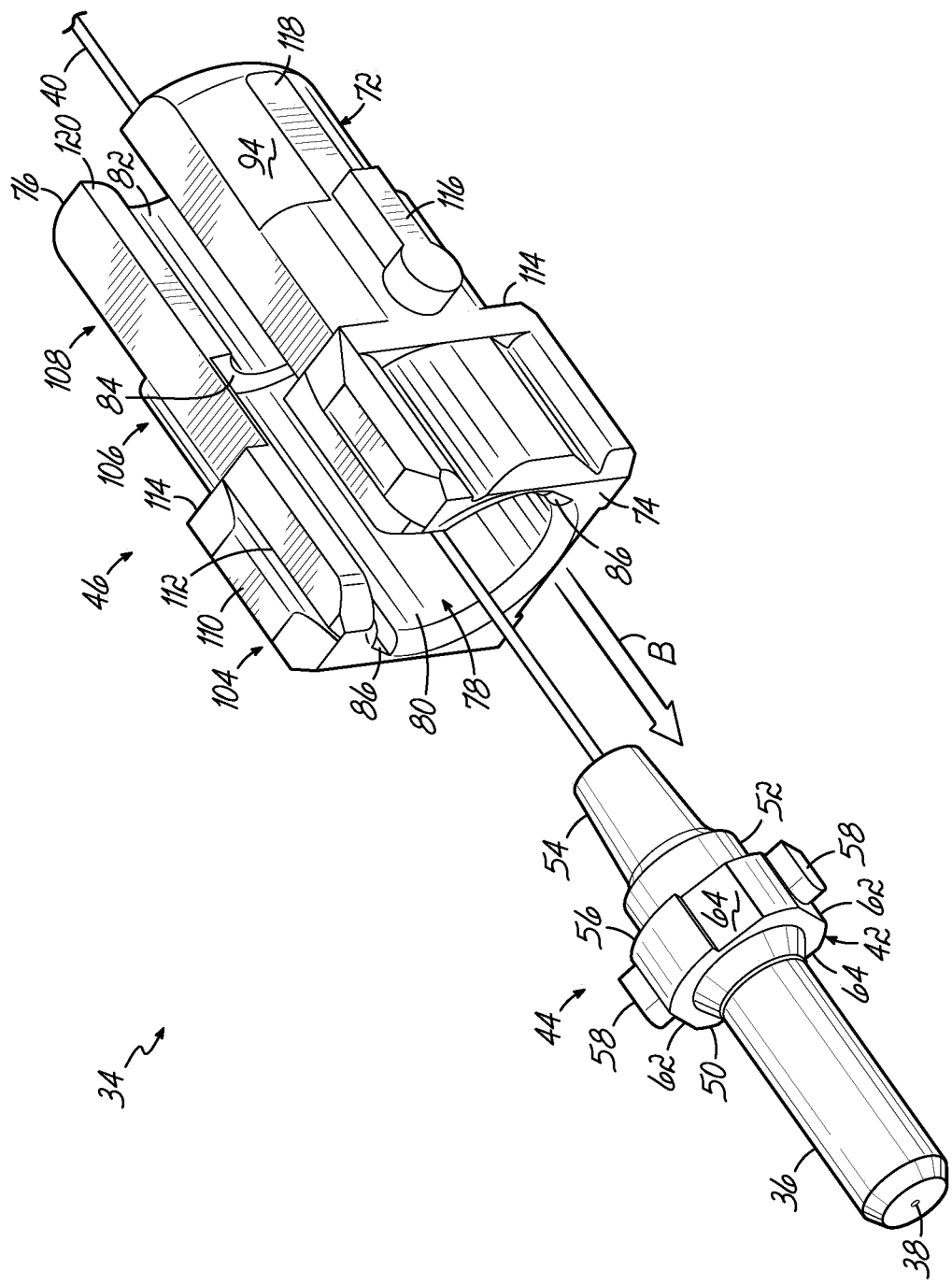
FIG. 3B is another disassembled perspective view of the fiber optic connector shown in FIG. 3A.

FIGS. 3A-3D illustrate an exemplary process for positioning the ferrule support assembly 44 in the shroud 46. As illustrated in FIG. 3A, the ferrule support assembly 44 may be coupled to the optical fiber 40. At a position along the optical fiber 40 and spaced from the ferrule support assembly 44, the shroud 46 may be positioned about the optical fiber 40 by passing the optical fiber 40 through the slot 120 in the shroud 46. This is illustrated by arrow A in FIG. 3A. In one embodiment, the width of the slot 120 may be just slightly larger than the diameter of the optical fiber 40 such that the optical fiber 40 may pass through the slot 120 in a clearance fit and into the passageway 78 of the shroud 46. In an alternative embodiment, however, the width of the slot 120 may be just slightly smaller than the diameter of the optical fiber 40 such that the shroud 46 slightly deforms or flexes to have the optical fiber 40 pass through the slot 120.

This prevents the optical fiber 40 from easily passing back out of the passageway 78 of the shroud 46.

In any event, with the shroud 46 disposed about the optical fiber 40 at a location spaced from the ferrule support assembly 44, the shroud 46 may be moved along the optical fiber 40 and towards the ferrule support assembly 44. This is illustrated by arrow B in FIG. 3B. As the shroud 46 approaches the ferrule support assembly 44, the ferrule support assembly 44 and the shroud 46 must be oriented relative to each other so that the guide tabs 58 on the collar 50 are generally aligned with the grooves 86 in the passageway 78 of the shroud 46. With the guide tabs 58 and the grooves 86 so aligned, the ferrule support assembly 44 may pass into the passageway 78 of the shroud 46 and be guided along the passageway 78. Should the guide tabs 58 and the grooves 86 be misaligned, then the ferrule support assembly 44 will not be able to pass into the passageway 78 of the shroud 46 indicating that the relative orientation of the two must be adjusted.

As the shroud 46 continues to move along the optical fiber 40, the ferrule support assembly 44 moves toward the shoulder 84. As the two approach each other, the intermediate tubular portion 52 and the trailing end tapered portion 54 of the ferrule holder 42 pass into the second passageway section 82 in the shroud 46 and the collar 50 approaches the wedges 88 disposed adjacent the shoulder 84. As shown in FIG. 3D, in order for the ferrule support assembly 44 to seat adjacent to or against the shoulder 84, the wedges 88 in the passageway 78 and the cutouts 64 on the collar 50 of the ferrule holder 42 must be generally aligned with each other. The wedges 88 and the cutouts 64 are positioned on the passageway 78 and the collar 50, respectively, in an asymmetric manner such that there is only one orientation of the ferrule support assembly 44 relative to the shroud 46 that allows the ferrule support assembly 44 to fully seat adjacent to or against the shoulder 84.

Thus, while the opposed guide tabs 58 on the collar 50 of the ferrule holder 42 limit the possible number of orientations of the ferrule support assembly 44 within the shroud 46 to two, the wedges 88 and cutouts 64 reduce that to only one possible orientation of the ferrule support assembly 44 within the shroud 46. Should the wedges 88 and the cutouts 64 be misaligned, the ferrule support assembly 44 will have to be removed from the shroud 46, turned by 180 degrees, and then reintroduced into the proximal end 74 of the shroud 46 in the same manner as described above. Then, the wedges 88 and the cutouts 64 should be aligned such that the ferrule support assembly 44 may be seated and the shoulder 56 of the collar 50 confront or abut against the shoulder 84 of the passageway 78. This is illustrated, for example, in FIGS. 3C and 3D. In alternative embodiments, the ferrule holder 42 and the shroud 46 may each have a single anti-rotation feature (e.g., one guide tab 58 on the ferrule holder 42 and one groove 86 on the shroud 46, or vice-versa) that cooperate to also limit the ferrule support assembly 44 to only one possible orientation within the shroud 46.

Figure 3C:
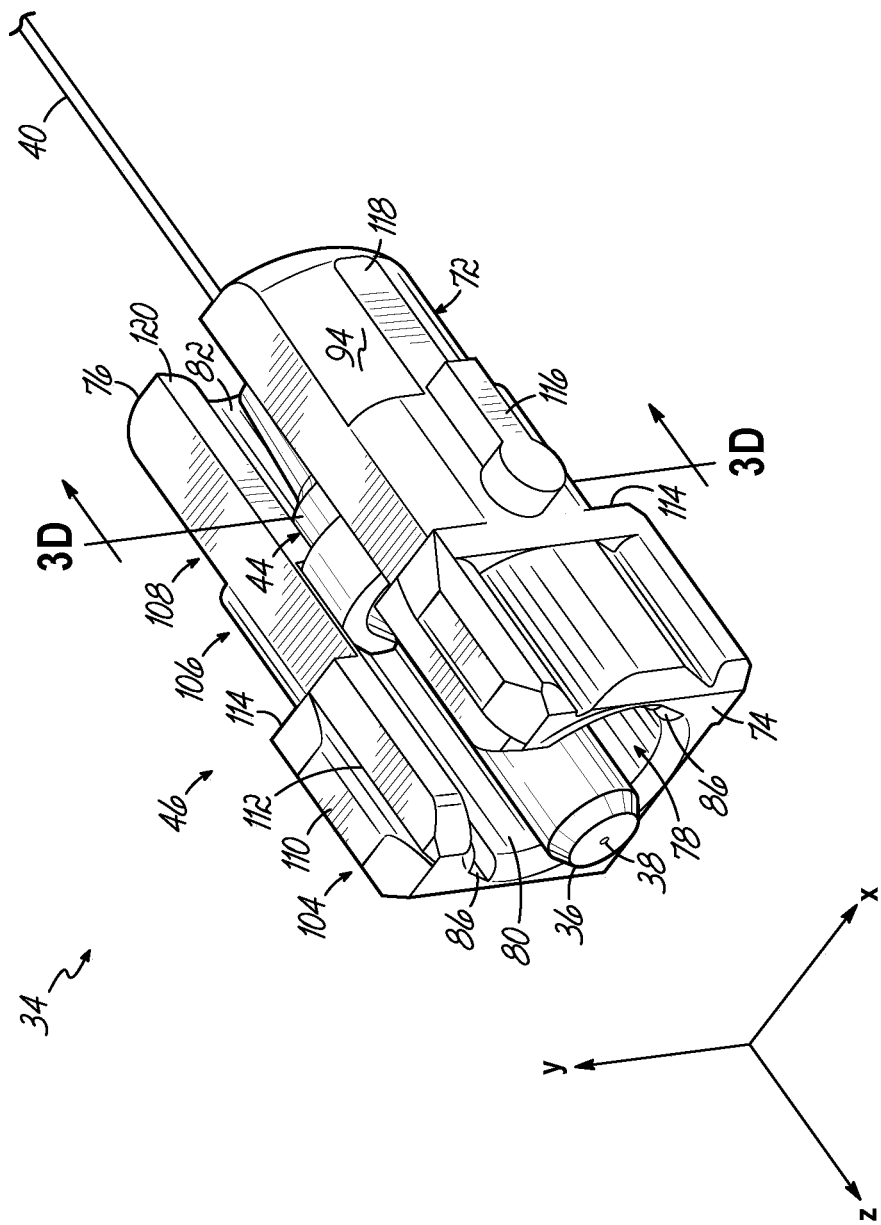
FIG. 3C is an assembled perspective view of the fiber optic connector shown in FIGS. 3A and 3B.
Figure 3D:
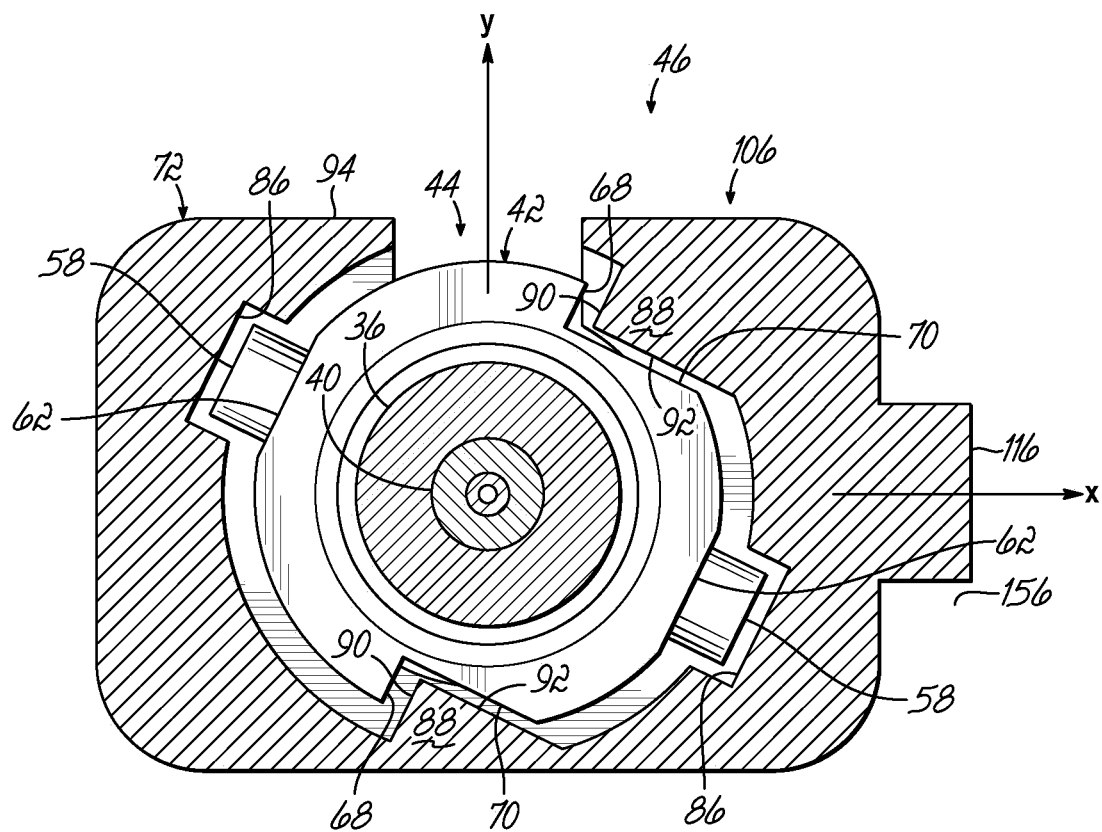
FIG. 3D is a cross-sectional view of the fiber optic connector shown in FIG. 3C taken along line 3D-3D.

Referring to FIGS. 3C and 3D, the ferrule support assembly 44 is not fixedly secured within the shroud 46 but is free to float within the shroud 46. Indeed, should the shroud 46 be moved rearwardly relative to the ferrule support assembly 44 (or the ferrule support assembly moved forwardly relative to the shroud 46) the shoulders 56, 84 may disengage and move apart from each other and the ferrule support assembly 44 will move back along the passageway 78 toward the proximal end 74 (see FIG. 3C). Additionally, the ferrule support assembly 44 may fit within the shroud 46 with a clearance fit such that there is some space or gap between the ferrule support assembly 44 and the shroud 46. More particularly, the guide tabs 58 and grooves 86, and the wedges 88 and the cutouts 64 may be sized to permit some small amount of movement of the ferrule holder 42 within, for example, the x-y plane (see FIG. 4A). By way of example and without limitation, the ferrule holder 42 may be able to laterally shift in the x and y directions. By providing some radial clearance between the ferrule support assembly 44 and the shroud 46, the ferrule 36 may better align with a ferrule of a mating connector within the adapter 96 (e.g., avoid non-axial loading of the ferrule within the adapter) and thereby reduce losses through the optical connection.

In addition to providing some small amount of lateral movement within the x-y plane as described above, the ferrule support assembly 44 may fit within the shroud 46 in a manner that limits rotations of the ferrule support assembly 44 relative to the shroud 46 about the longitudinal axis of the shroud (i.e., the z axis; see FIG. 4) to a small range of angles. Thus, the ferrule support assembly 44 may rotationally float within the shroud 46 by some small amount when the ferrule support assembly 44 is seated in the shroud 46. This rotational clearance may be achieved through the interaction between the wedges 88 and the cutouts 64. As illustrated in FIG. 4A, there may be a space or gap between the first and second planar surfaces 68, 70 of the cutouts 64 and the first and second planar surfaces 90, 92 of the wedges 88. Thus, from the perspective shown in FIG. 4A, if the ferrule support assembly 44 is rotated clockwise relative to the shroud 46, the first planar surface 68 of the upper cutout 64 may contact the first planar surface 90 of the upper wedge 88 to restrict any further rotation in the clockwise direction. Additionally or alternatively, the second planar surface 70 of the lower cutout 64 may contact the second planar surface 92 of the lower wedge 88 to restrict any further rotation in the clockwise direction.

In a similar manner, if the ferrule support assembly 44 is rotated counterclockwise relative to the shroud 46, the second planar surface 70 of the upper cutout 64 may contact the second planar surface 92 of the upper wedge 88 to restrict any further rotation in the counterclockwise direction. Additionally or alternatively, the first planar surface 68 of the lower cutout 64 may contact the first planar surface 90 of the lower wedge 88 to restrict any further rotation in the counterclockwise direction. Thus, through the interactions between the cutouts 64 and the wedges 88, a slight rotation of the ferrule support assembly 44 within the shroud 46 about the z-axis may be permitted while preventing larger scale rotations. Because the ferrule support assembly 44 may be positioned in the shroud 46 in a specific orientation, the ferrule 36 may be configured as a physical contact (PC), an angled physical contact (APC), or an ultra-physical contact (UPC).

In the embodiment described above, the cutouts 64 and the wedges 88 provide the mechanism for orienting the ferrule support assembly 44 relative to the shroud 46 and for limiting rotations of the ferrule support assembly 44 relative to the shroud 46 about the z-axis. In still a further embodiment, the rotation limiting function may be provided by the interaction between the guide tabs 58 and the grooves 86. As one might imagine from FIG. 4A, the guide tabs 58 fit within the grooves 86 in a clearance fit that provides a gap on both sides of the guide tabs 58. Through this clearance fit, the ferrule support assembly 44 may be able to rotationally shift about the z-axis relative to the shroud 46. Thus, in this embodiment, the orienting of the ferrule support assembly 44 relative to the shroud 46 may be provided by the cutouts 64 and the wedges 88 while the rotation limiting feature may be provided by the guide tabs 58 and the grooves 86.

With the ferrule support assembly 44 positioned in the shroud 46 as described above and illustrated in FIGS. 3C and 3D, the connector 34 may be coupled to an optical component, such as adapter 96. In one aspect of the disclosure, the shroud 46 of the connector 34 may be configured to couple to a conventional adapter 96 without modifying the adapter 96 to accommodate the shroud 46 of connector 34. FIGS. 4 and 4A illustrate the coupling of the connector 34 to an adapter 96. The adapter 96, which is arranged for an SC-type connector, includes a pair of generally rectangular housings 128a, 128b mated together at a joint 130 and defining a first end 132, a second end 134, and a passageway 136 extending between the first and second ends 132, 134. Each housing 128a, 128b includes a clip 138a, 138b positioned within the passageway 136 and which are also mated together at the joint 130. Each clip 138a, 138b includes a base 140 and a pair of opposed spring arms 142 extending from the base 140 (and in opposite directions within the passageway 136), and a tubular member 144 also extending from the base 140 and positioned between the two opposed spring arms 142. The spring arms 142 terminate in a claw 146 that defines an engagement surface 148. The tubular member 144 defines a passageway 150 that also extends through the base 140.

When the housings 128a, 128b are mated together, the passageways 150 of the tubular members 144 are open to each other and are configured to receive an alignment tube 152. The alignment tube may be a solid or split tube design as known in the industry. The alignment tube 152 is configured to receive the ferrule of connectors inserted into the first and second ends 132, 134 of the adapter 96 and facilitate the optical connection between their respective optical fibers. Adapters as described above are well-known in the fiber optic industry and thus will not be described in any further detail herein. While an SC-type connector and adapter are described herein, it should be understood that aspects of the invention are not limited to only one type of connector and adapter, but may apply to other types of connectors and corresponding adapters known to those of ordinary skill in the art (e.g., see FIGS. 6 and 6A and description below).

The shroud 46 of the connector 34 is configured to engage with one of the clips 138 to retain the connector 34 to the adapter 96. As illustrated in FIG. 4, the connector 34 may be inserted into the second end 134 of the adapter 96 and engage with clip 138b. To do so, the connector 34 must be properly oriented relative to the adapter 96. This may be achieved, for example, by the mere geometry of the adapter 96 and the shroud 46 of the connector 34 (which may limit the possible orientations to two), and the key 116 on the shroud 46. More particularly, the adapter 96 may include a side wall 154 defining a keyway 156 open to the second end 134 of the adapter 96 that is configured to receive the key 116 as the connector 34 is being inserted into the adapter 96. Should the key 116 may be misaligned relative to the keyway 156, the connector 34 will be blocked from fully entering the adapter 96.

With the key 116 and the keyway 156 aligned, however, the connector 34 will be able to fully pass into the passageway 136 of the housing 128b. As the connector 34 moves along the passageway 136 toward the joint 130, the end of the ferrule 36 contacts the end of the tubular member 144 (each of which may be chamfered) and is guided into the alignment tube 152 positioned within the passageway 150 of the tubular member 144. Additionally, as the connector 34 moves along the passageway 136 toward the joint 130, the proximal end 74 of the shroud 46 contacts the ends of the spring arms 142 (which may be chamfered). This causes the spring arms 142 to flex outwardly away from each other to allow the spring arms 142 to pass along the channels 112 in the proximal portion 104 of the shroud 46. As the connector 34 is further moved toward the joint 130, the spring arms 142 reach the end of the proximal portion 104 of the shroud 46 and move or snap back toward each other under the spring bias such that the claws 146 drop down and the engagement surfaces 148 of the claws 146 confront and preferably abut the shoulders 114. At this point, the connector 134 is coupled to the adapter 96 and the shroud 46 is generally prohibited from moving relative to the housing 128b of the adapter 96. For example, rearward movement of the shroud 46 from the adapter 96 is prevented by the abutting contact between the engagement surfaces 148 of the claws 146 and the shoulders 114 on the shroud 46 of the connector 34.

Figure 5:
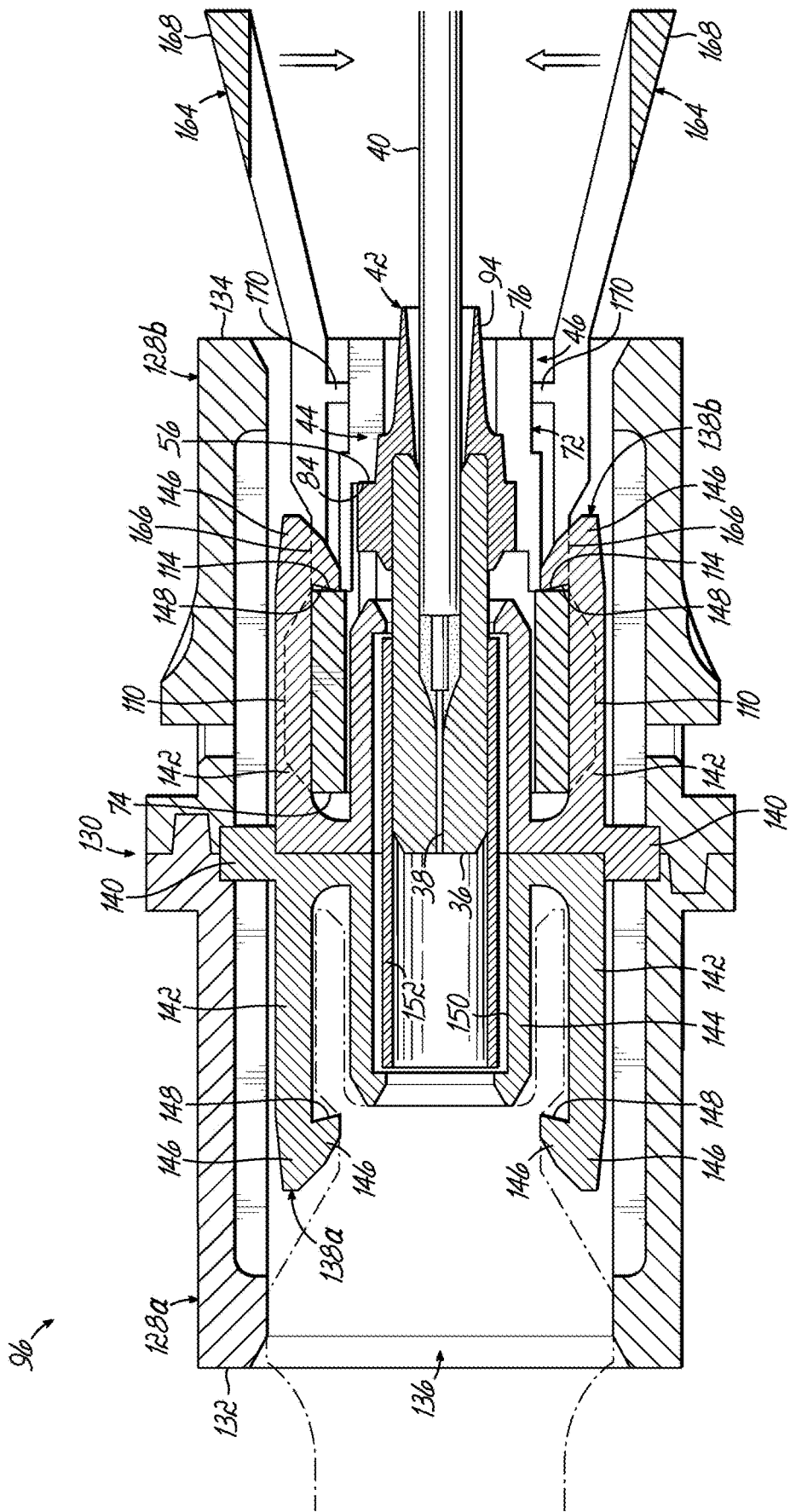
FIG. 5 is a cross-sectional view of a fiber optic connector in accordance with another embodiment of the disclosure.

In the embodiment shown in FIG. 4, the connector 34 cannot be easily removed from the adapter 96 and is intended for applications where the connector 34 is not repeatedly connected/disconnected from the adapter 96. In an alternative embodiment, and as illustrated in FIG. 5, the connector 34 may include a latch having a pair of lever arms 164 to facilitate the removal of the connector 34 from the adapter 96. As illustrated in this figure, each lever arm 164 includes a first end 166 configured to engage a respective claw 146 of the clip 138b, a second end 168 configured to be gripped by a technician, and a pivot point 170 disposed between the first and second ends 166, 168 at which the lever arms 164 are coupled to the shroud 46. When a technician squeezes the second ends 168 of the lever arms 164 together, the first ends 166 of the lever arms 164 move outward away from each other to flex the spring arms 142 outward and away from each other, thereby releasing the claws 146 from behind the shoulders 114 on the shroud 46. At this point, the connector 34 may be moved in a rearward direction and removed from the adapter 96. Thus, in this embodiment, the connector 34 may be easily connected and disconnected from the adapter 96.

Figure 6:
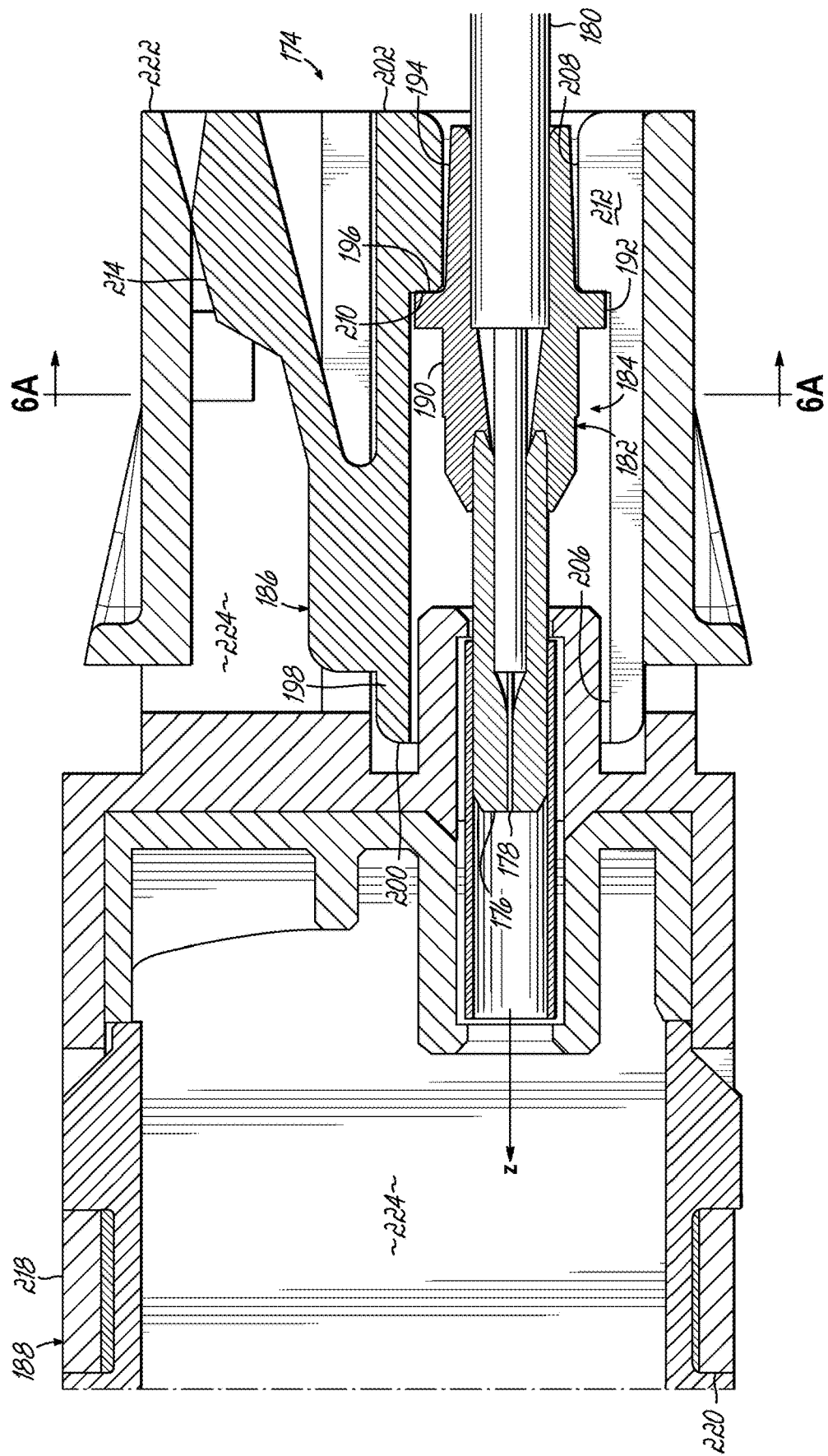
FIG. 6 is a cross-sectional view of a fiber optic connector in accordance with another embodiment of the disclosure.
Figure 6A:
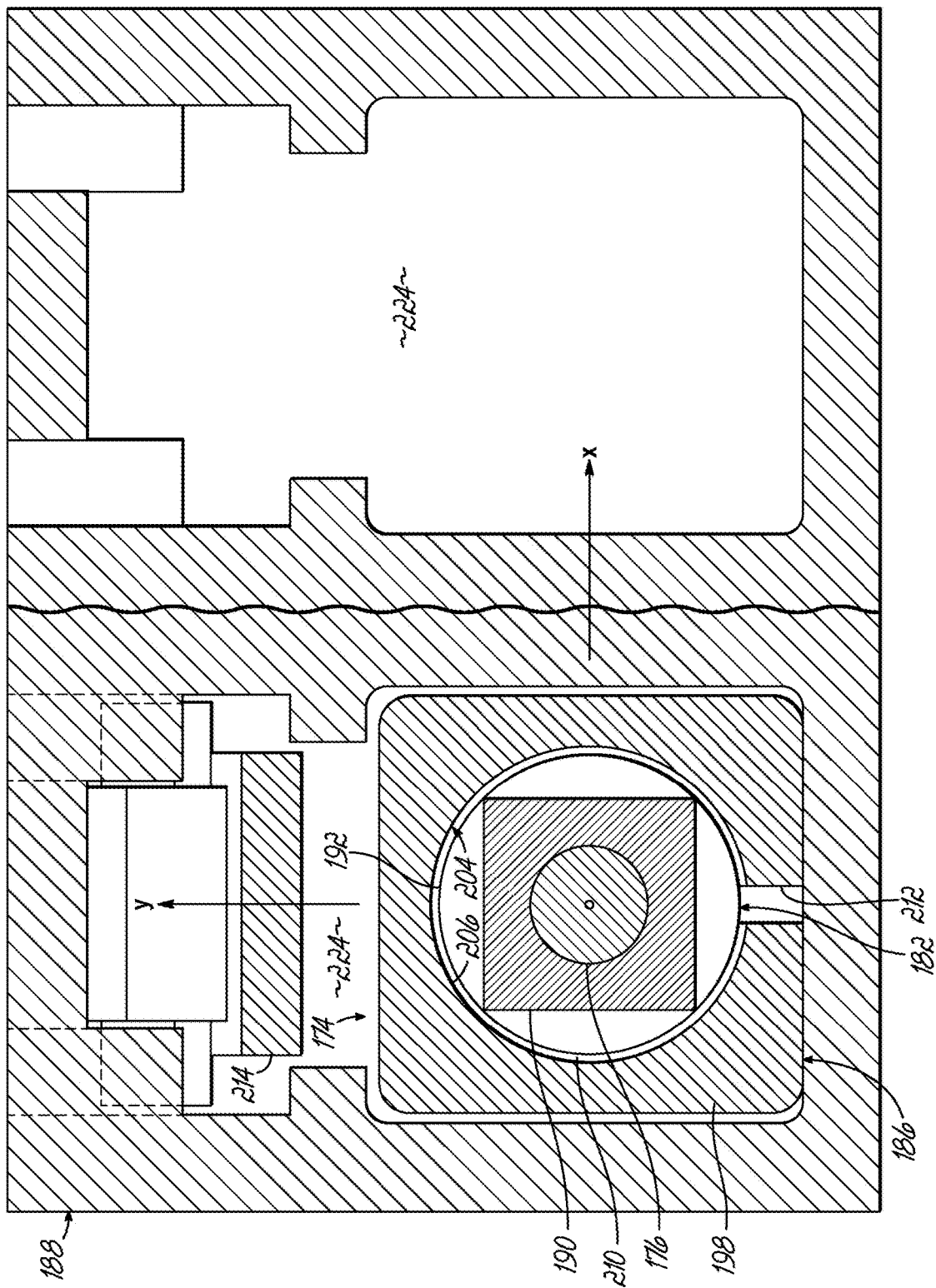
FIG. 6A is another cross-sectional view of the fiber optic connector shown in FIG. 6 taken along line 6A-6A.

FIGS. 6 and 6A illustrate another connector 174 in accordance with an embodiment of the disclosure shown as an LC-type of connector. The connector includes a ferrule 176 having a ferrule bore 178 configured to support an optical fiber 180, and a ferrule holder 182 coupled to the ferrule 176 and from which the ferrule 176 extends. The combination of the coupled ferrule 176 and the ferrule holder 182 will be referred to herein as the ferrule support assembly 184. The connector 174 further includes an outer housing or shroud 186 configured to receive the ferrule support assembly 184 and support the coupling of the optical fiber 40 to another optical component. By way of example, the shroud 186 may be configured to couple to an adapter 188 for providing an optical connection to the optical fiber of a mating connector.

Similar to the above, the shroud 186 may have a one-piece construction and provide the benefits described above for such a construction. Moreover, the shroud 186 of connector 174 does not trap the ferrule support assembly 184 within shroud 186. Instead, the shroud 186 may be configured to receive the ferrule support assembly 184 therein and be in abutting engagement with the ferrule support assembly 184 in an "in-use" configuration. However, there is no fixation or confinement between the shroud 186 and the ferrule support assembly 184. It is only when the shroud 186 of the connector 174 is coupled to the fiber optic component that the ferrule support assembly 184 is confined within the shroud 186. Furthermore, the connector 174 provides cost benefits due to the use of fewer parts. For example, the two-part housing, end cap, lead-in tube and spring of conventional connectors may be omitted from the connector 174. The omission of these additional parts may lead to significant cost reductions. Similar to the above, the shroud 186 is simpler and easier to manufacture as compared to the encasement of the ferrule and ferrule holder of conventional connectors. For example, the shroud 186 may be made from a low-cost molding process, such as an injection molding process using molding tools that lack complexity (e.g., movable slides or the like). Additionally, the shroud 186 may be formed from low-cost thermoplastic materials. For example, the shroud 186 may be formed from polyetherimide, polybutylene terephthalate, polysulfone, polyethersulfone, polycarbonate, polypropylene, and/or polyethylene. The combination of lower cost manufacturing processes and lower cost materials may provide additional significant cost reductions. The shroud 186 may also be formed through an additive manufacturing process. Alternatively, the shroud 186 may be made from metallic materials using machining or die casting processes.

The ferrule 176 may be conventional and may be coupled to the optical fiber 180 in the conventional manner. The ferrule holder 182 may be plastic and formed through a molding process. Alternatively, the ferrule holder 182 may be formed from metal through a machining process. The coupling of the ferrule 176 to the ferrule holder 182 may also be achieved using conventional processes. In one embodiment, the ferrule holder 182 may include a first portion 190 from which the ferrule 176 extends, a second intermediate portion in the form of a collar 192, and a third trailing end tapered portion 194. In one embodiment, the first portion 190 may be generally rectangular in cross section. Additionally, the collar 192 may have a cross dimension generally greater than the cross dimension of the trailing end tapered portion 194 to define a shoulder 196 at the junction of the two. The trailing end tapered portion 194 may decrease in size in a direction away from the collar 192. The end of the trailing end tapered portion 194 may be sized to be larger than the optical fiber 180 received in the ferrule holder 182.

In an exemplary embodiment, the shroud 186 may include a generally rectangular body 198 having a first proximal end 200, a second distal end 202, and a passageway 204 extending between the proximal and distal ends 200, 202. The passageway 204 may be generally circular in cross section and include a first passageway section 206 adjacent the proximal end 200 and a second passageway section 208 adjacent the distal end 202. The diameter of the first passageway section 206 is generally greater than the diameter of the second passageway section 208 to define a shoulder 210 at the junction between the two passageway sections 206, 208. The passageway 204 is configured to receive the ferrule support assembly 184. The first passageway section 206 may be sized to be slightly greater than the collar 192 of the ferrule holder 182. However, the second passageway section 208 may be sized to be smaller than the collar 192, such that the collar 192 may not pass into the second passageway section 208. Moreover, the second passageway section 82 may be sized to be slightly greater than the trailing end tapered portion 194. Thus, the trailing end tapered portion 194 may pass into the second passageway section 208 in a clearance fit, for example.

In an exemplary embodiment, the shroud 186 may be configured as a split shroud having a slot 212 through the body 198 that is open to the passageway 204 of the shroud 46. The slot 212 may be configured to extend along the full length of the shroud 186 from the proximal end 200 to the distal end 202 and is configured to allow the ferrule support assembly 184 to be positioned in the shroud 186 in a manner similar to that described above. The slot 212 may be positioned in the lower surface of the generally rectangular body 198. Additionally, the shroud 186 may include a latch having a lever arm 214 extending from the upper surface of the body 198. The lever arm 214 is configured to facilitate connecting and disconnecting the connector 174 to another optical component, such as adapter 188. Lever arms 214 for LC-type connectors are generally known in the art and thus will not be described in further detail herein.

The positioning of the ferrule support assembly 184 within the shroud 186 may be similar to that described above. Accordingly, at a position along the optical fiber 180 and spaced from the ferrule support assembly 184, the shroud 186 may be positioned about the optical fiber 180 by passing the optical fiber 180 through the slot 212 in the shroud 186. In one embodiment, the width of the slot 212 may be just slightly larger than the diameter of the optical fiber 180 such that the optical fiber 180 may pass through the slot 212 in a clearance fit and into the passageway 204 of the shroud 186. In an alternative embodiment, however, the width of the slot 212 may be just slightly smaller than the diameter of the optical fiber 180 such that the shroud 186 slightly deforms or flexes to have the optical fiber 180 pass through the slot 212. This prevents the optical fiber 180 from easily passing back out of the passageway 204 of the shroud 186.

With the shroud 186 disposed about the optical fiber 180 at a location spaced from the ferrule support assembly 184, the shroud 186 may be moved along the optical fiber 180 and towards the ferrule support assembly 184. As the shroud 186 approaches the ferrule support assembly 184, the ferrule support assembly 184 passes into the passageway 204 of the shroud 186 and toward the shoulder 210. Unlike the previous embodiment, this embodiment does not include any guide features or orientation features between the ferrule holder 182 and the shroud 186. Thus, the ferrule support assembly 184 may be positioned in the passageway 204 of the shroud 186 at any angle about the z-axis. Because the connector 174 lacks orientation features, the connector 174 may be limited to symmetric ferrule geometries, such as physical contact (PC) or ultra-physical contact (UPC) geometries. As the shroud 186 continues to move along the optical fiber 180, the ferrule support assembly 184 moves toward the shoulder 210. As the two approach each other, the trailing end portion 194 of the ferrule holder 182 may pass into the second passageway section 208 in the shroud 186 and the collar 192 may be seated adjacent the shoulder 210 such that the shoulder 196 of the collar 192 confronts or abuts against the shoulder 210 of the passageway 204.

Notably, the ferrule support assembly 184 is not fixedly secured within the shroud 186 but is free to float within the shroud 186. Indeed, should the shroud 186 be moved rearwardly relative to the ferrule support assembly 184 (or the ferrule support assembly moved forwardly relative to the shroud 186) the shoulders 196, 210 disengage and move apart from each other and the ferrule support assembly 184 will move back along the passageway 204 toward the proximal end 200. Additionally, the ferrule support assembly 184 may fit within the shroud 186 with a clearance fit such that there is some space or gap between the ferrule support assembly 184 and the shroud 186. More particularly, the collar 192 may be sized to permit some small amount of movement of the ferrule holder 182 within, for example, the x-y plane. By way of example and without limitation, the ferrule holder 182 may be able to laterally shift in the x and y directions. By providing some radial clearance between the ferrule support assembly 184 and the shroud 186, the ferrule 176 may better align with a ferrule of a mating connector within the adapter 188 (e.g., avoid bending of the ferrule within the adapter) and thereby reduce losses through the optical connection.

With the ferrule support assembly 184 positioned in the shroud 186 as described above, the connector 34 may be coupled to an optical component, such as adapter 188. In an aspect of the disclosure, the shroud 186 of the connector 174 may be configured to couple to a conventional adapter 188 without modifying the adapter 188 to accommodate the shroud 186 of the connector 174. FIGS. 6 and 6A illustrate the coupling of the connector 174 to an adapter 188. The adapter 188, which is arranged for an LC-type connector, includes a housing 218 defining a first end 220, a second end 222, and a passageway 224 extending between the first and second ends 220, 222. In one embodiment, the adapter 188 may be configured with multiple ports at each of the first and second ends 220, 222 to accommodate multiple connectors. The connector 174 may be received within one of the ports of the adapter 188 and coupled thereto in a conventional manner known to those of ordinary skill in the art. Accordingly, a further description of the interaction between the shroud 186 and the adapter 188 will not be provided herein.

It should be recognized that when the connectors 34, 174 are coupled to their respective adapters 96, 188, the shoulders on the ferrule holders 42, 192 may not be pressed against the shoulders 84, 210 in the passageways 78, 204 of the shrouds 46, 186. Thus, the position of the end face of the ferrules 36, 176 may not be in their intended positions to ensure a good connection with a mating connector. However, when a mating connector (not shown), which is configured in a conventional sense and thus is spring loaded, is coupled to the first ends 132, 220 of the adapters 96, 188, the ferrule of the mating connector pushes against the ferrule 36, 176 of the connector 34, 174 to move the ferrule support assembly 44, 184 backwards within their shrouds 46, 186 such that the ferrule holders 42, 192 engage against the shoulders 84, 210 and the end face of the ferrules 36, 176 are in their intended positions and make good contact with the ferrule of the mating connectors. Thus, in one embodiment of the disclosure, an adapter assembly includes an adapter (such as adapters 96, 188) having a first connector (such as connectors 34, 174) coupled to a port at one end thereof and a conventional, spring-loaded connector (such as connector 10) coupled to a corresponding port at the other end thereof. Accordingly, the proper use of the connectors 34, 174 may require that the mating connector in the adapters 96, 188 be a conventional spring loaded design.

Figure 7:
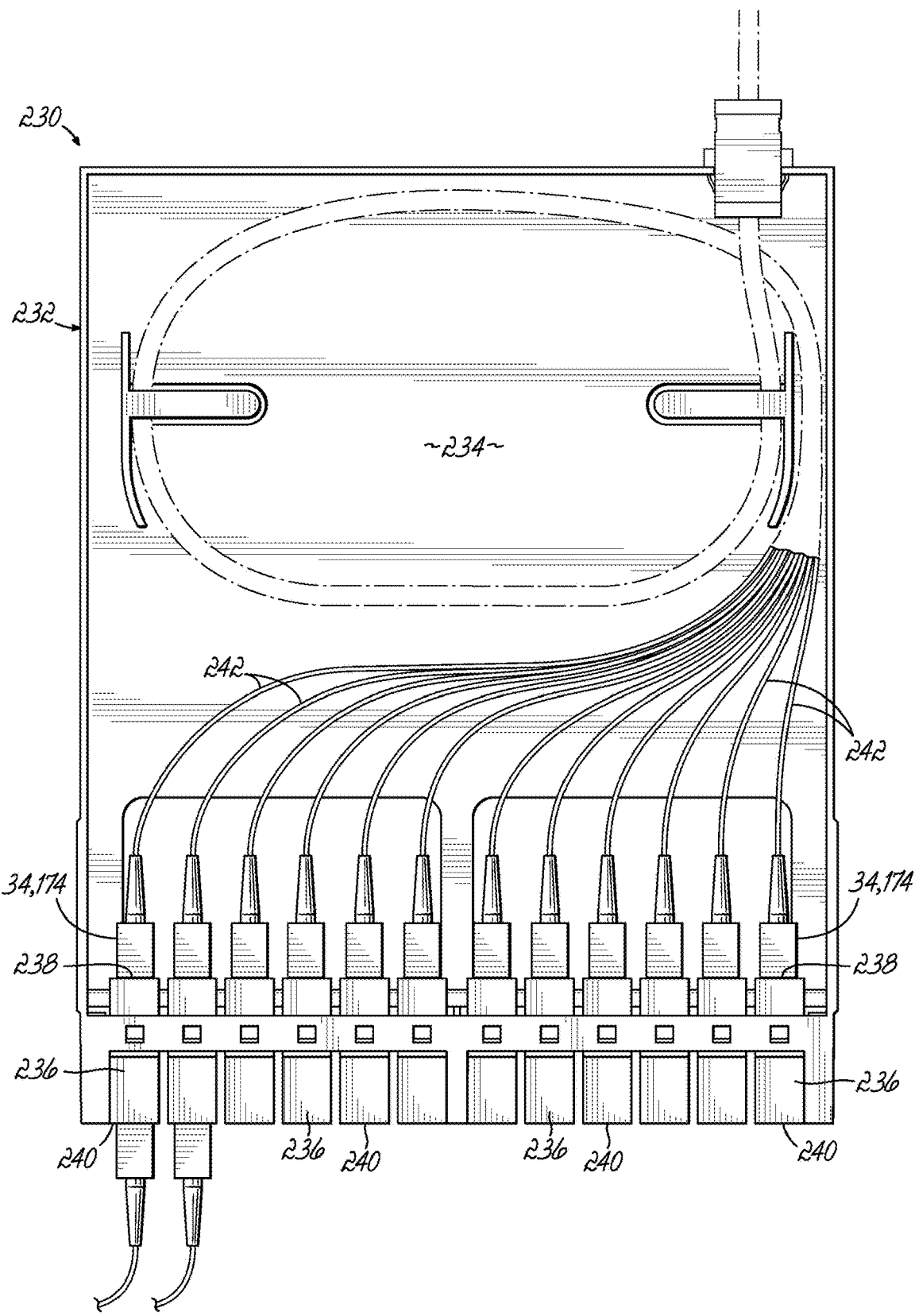
FIG. 7 is a top view of a fiber optic module that incorporates fiber optic connectors in accordance with an embodiment of the disclosure.

As noted above, the connectors 34, 174 in accordance with embodiments of the disclosure are configured for use in low-impact environments which are not subject to significant environmental forces. Such an environment may be provided by optical connections that occur within an isolated space that is generally closed off from the external environment and not readily accessible. Such optical connections are not configured to be regularly connected and disconnected but instead are configured to be connected once and remain connected for an extended period of time (e.g., such as the useful life of the optical component). FIG. 7 illustrates an exemplary environment where the connectors 34, 174 may be utilized.

More particularly, FIG. 7 illustrates the interior of a module 230 (sometimes referred to as a "cassette"), such as a module for rack-mounted fiber optic equipment, having a module body 232 that defines an interior cavity 234 that is generally isolated off from the external environment. The module 230 includes at least one adapter 236 and preferably a plurality of adapters 236 at a front end thereof with each adapter 236 including an internal end 238 accessible from inside the interior cavity 234 and an external end 240 accessible from the exterior of the module 230. The module 230 includes a plurality of optical fibers 242 inside the cavity 234. The assembly in FIG. 7 includes a lid (not shown), which encloses and isolates the interior connections from outside mechanical forces. In accordance with an aspect of the disclosure, the optical fibers 242 may be terminated by a connector, such as connector 34 or 174 as described above, and coupled to the internal end 238 of a port on one of the adapters 236. The interior cavity 234 is not configured to be accessed during the use of the module 230. Moreover, the optical fibers 242 are not expected to be disconnected from the adapters 236 during the use of the module 230. The use of connectors according to this disclosure in modules is but one exemplary environment and there are other environments in which such connectors may be useful. By way of example, multiport service terminals and various fiber optic cassettes may provide low force/low connection frequency environments suitable for the connectors described herein.

The connectors for hardware interiors described above may be subject to various modifications and remain within the scope of the present disclosure. By way of example, the shrouds 46, 186 of the connectors 34, 174 have been described herein as split shrouds having a slot 120, 212 formed therethrough for positioning the shrouds 46, 186 about the optical fibers 40, 180. In alternative embodiments, however, the shrouds may omit the slots and be circumferentially continuous. In these embodiments, the process for making an optical connection remains essentially the same as above but for threading the shrouds onto the optical fibers before the ferrules are coupled to the ferrule holders (and possibly before the optical fibers are coupled to the ferrules).

In a further example, in the connectors 34, 174 described above, the ferrule assemblies 44, 184 are not spring-loaded within their respective shrouds 46, 186. Instead, the connector 34, 174 are configured such that a shoulder of the ferrule holders abuts with a shoulder of the shrouds when a spring-loaded connector is mated to the adapter (i.e., the spring load from the mating adapter causes the two shoulders of the connector to contact each other). However, in alternative embodiments, a spring may be positioned between the ferrule support assemblies and the shrouds so as also have a spring load. For example, a spring (not shown) may be positioned between the shoulders 56 of the ferrule holders 42 and the shoulders 84 of the shroud 46.

In yet another example, the LC-type connector 174 described above lacked the orientation features and anti-rotations features described in the context of the SC-type connector 34. These features may not be necessary when PC or UPC ferrule geometries are being used due to the symmetries of the end face of the ferrules. In an alternative embodiment, however, the orientation features/anti-rotation features described for connector 34 may also be used in LC-type connector. In this way, APC ferrule geometries may also be used with LC-type connectors.

Furthermore, while the connectors above were described as having ferrules configured to receive a single optical fiber, it should be appreciated that aspects of the present disclosure may be extended to multi-fiber ferrules and associated ferrule holders. More particularly, the multi-fiber ferrule holders may be configured to interact with a one-piece shroud in the manner described above. These arrangements may include MPO-type connectors or other multifiber connectors.

Those skilled in the art will appreciate that other modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A fiber optic connector for connecting one or more optical fibers to a fiber optic component, comprising:
    a ferrule configured to receive the one or more optical fibers;
    a ferrule holder configured to be coupled to the ferrule, the ferrule and ferrule holder forming a ferrule support assembly when coupled together; and
    a shroud configured to be positioned about the ferrule support assembly and connectable to the fiber optic component,
    wherein the ferrule support assembly and the shroud are configured so that the ferrule support assembly is movable relative to the shroud to positions outside the shroud when disconnected from the fiber optic component,
    wherein the ferrule support assembly is confined within the shroud when the shroud is connected to the fiber optic component, and
    wherein the ferrule holder includes a first shoulder and the shroud includes a second shoulder, and wherein the first and second shoulders are configured to abut each other when the shroud is connected to the fiber optic component.

2. The fiber optic connector of claim 1, wherein the ferrule holder and the shroud include orientation features and there is only one relative orientation between the ferrule support assembly and the shroud that permits the ferrule support assembly to be fully received within the shroud.

3. The fiber optic connector of claim 2, wherein the orientation features include a pair of cutouts in the ferrule holder and a pair of wedges on the shroud, and wherein the wedges are configured to be received in the cutouts when the ferrule support assembly is seated within the shroud.

4. The fiber optic connector of claim 1, wherein the ferrule holder and the shroud include anti-rotation features that limit the rotation of the ferrule support assembly relative to the shroud.

5. The fiber optic connector of claim 4, wherein the anti-rotation features include at least one guide tab on one of the ferrule holder or shroud and at least one groove in the other of the ferrule holder or the shroud, wherein each guide tab of the at least one guide tab is configured to be received in a corresponding groove of the at least one groove when the ferrule support assembly is received in the shroud.

6. The fiber optic connector of claim 1, wherein the shroud is a split shroud including a slot that extends along a length of the shroud.

7. The fiber optic connector of claim 1, wherein the ferrule support assembly is configured to be received within the shroud in a clearance fit that provides some lateral movement of the ferrule support assembly within the shroud.

8. The fiber optic connector of claim 1, wherein the shroud includes a latch for selectively disconnecting the shroud from the fiber optic component.

9. The fiber optic connector of claim 1, wherein the shroud has a one-piece molded construction.

10. A fiber optic hardware assembly, comprising:
    a hardware body defining an interior and having at least one side separating the interior from an external environment;
    one or more adapters coupled to the at least one side of the hardware body, each adapter of the one or more adapters having one or more internal ports on a first end of the adapter and one or more external ports on a second end of the adapter, the one or more internal ports being accessible from the interior of the hardware body and the one or more external ports being accessible from the external environment;
    a plurality of fiber optic assemblies positioned within the interior, each of the plurality of fiber optic assemblies comprising:
        an optical fiber; and
        a fiber optic connector coupled to the optical fiber, the fiber optic connector including a ferrule secured to the optical fiber, a ferrule holder coupled to the ferrule, the ferrule and ferrule holder forming a ferrule support assembly, and a shroud positioned about the ferrule support assembly and connected to an internal port of the one or more adapters,
    wherein the ferrule support assembly is movable relative to the shroud to positions outside the shroud when the shroud is disconnected from the internal port of the one or more adapters, and
    wherein the ferrule support assembly is confined within the shroud when the shroud is connected to the internal port of the one or more adapters.

11. The fiber optic hardware assembly of claim 10, wherein the hardware body is configured to isolate the interior of the hardware body from the external environment.

12. The fiber optic hardware assembly of claim 10, wherein the hardware body includes a front side, a rear side, lateral sides between the front side and the rear side, a top side, and a bottom side, and wherein the one or more adapters are disposed in the front side or rear side of the hardware body.

13. A method of forming a fiber optic assembly, comprising:
    coupling an optical fiber to a ferrule, wherein the ferrule receives the optical fiber;
    coupling the ferrule to a ferrule holder, the ferrule and the ferrule holder forming a ferrule support assembly when coupled together;
    positioning a shroud over the optical fiber at a location spaced from the ferrule support assembly;
    sliding the shroud toward ferrule support assembly and receiving the ferrule support assembly within the shroud such that the shroud is positioned about the ferrule support assembly, the ferrule support assembly remaining movable relative to the shroud and capable of being positioned outside the shroud when the shroud is not connected to a fiber optic component, and wherein the ferrule support assembly and the shroud together form a fiber optic connector; and
    coupling the shroud to the fiber optic component, wherein when the shroud is coupled to the fiber optic component, the ferrule support assembly is confined within the shroud, wherein the ferrule holder includes a first shoulder and the shroud includes a second shoulder, and wherein the first and second shoulders are configured to abut each other when the shroud is coupled to the fiber optic component.

14. The method of claim 13, wherein the shroud is a split shroud having a slot, and wherein positioning the shroud over the optical fiber comprises passing the optical fiber through the slot in the shroud.

15. The method of claim 13, further comprising:
orienting the ferrule support assembly relative to the shroud so that orientation features on the ferrule holder and the shroud are aligned; and
receiving the ferrule support assembly within the shroud when the orientation features are aligned.

16. The method of claim 13, further comprising limiting the rotation of the ferrule support assembly relative to the shroud.

17. The method of claim 13, wherein the fiber optic component is an adapter having one or more ports at a first end of the adapter and one or more corresponding ports at a second end of the adapter, the method further comprising:
coupling the shroud to a port at the first end of the adapter; and
coupling a spring-biased connector to the corresponding port at the second end of the adapter,
wherein the spring-biased connector urges the ferrule support assembly rearward relative to the shroud so that a shoulder of the ferrule holder abuts a shoulder of the shroud and the ferrule support assembly is in a fixed position relative to the shroud.

18. The fiber optic connector of claim 1, wherein the ferrule support assembly is free to float within the shroud when confined within the shroud such that the first and second shoulders may move apart from each other.

19. The fiber optic connector of claim 18, wherein the ferrule support assembly is not spring-biased when confined within the shroud.

20. The fiber optic hardware assembly of claim 10, wherein for each fiber optic assembly of the plurality of fiber optic assemblies:
the ferrule holder includes a first shoulder and the shroud includes a second shoulder, and the first and second shoulders are configured to abut each other when the shroud is connected to the internal port of the one or more adapters;
the ferrule support assembly is free to float within the shroud when confined within the shroud such that the first and second shoulders may move apart from each other; and
the ferrule support assembly is not spring-biased when confined within the shroud.

* * * * *